United States Patent
Gontmakher et al.

(12)
(10) Patent No.: US 6,368,527 B1
(45) Date of Patent: Apr. 9, 2002

(54) METHOD FOR MANUFACTURE OF FOAMED PERLITE MATERIAL

(76) Inventors: Vladimir Gontmakher; Evgueni Pevzner, both of Kelkheimer Strasse 11, 65779 Kelkheim-Fischback (DE)

( * ) Notice: Subject to any disclaimer, the term of this patent is extended or adjusted under 35 U.S.C. 154(b) by 0 days.

(21) Appl. No.: 09/641,290

(22) Filed: Aug. 18, 2000

(51) Int. Cl.⁷ .............................................. B29C 65/00
(52) U.S. Cl. ......................................... 264/42; 264/43
(58) Field of Search ............................. 264/42, 43, 44, 264/628

(56) References Cited

U.S. PATENT DOCUMENTS

| | | | |
|---|---|---|---|
| 3,886,076 A | | 5/1975 | Venable |
| 3,975,174 A | | 8/1976 | Camerlinck |
| 4,313,997 A | * | 2/1982 | Ruff et al. .................. 428/220 |
| 4,992,321 A | | 2/1991 | Kandachi et al. |
| 5,034,160 A | * | 7/1991 | Kindt et al. ................ 252/604 |
| 5,516,351 A | | 5/1996 | Solomon et al. |
| 6,149,831 A | * | 11/2000 | DePorter et al. .............. 252/62 |

FOREIGN PATENT DOCUMENTS

SU        1571013 A1    5/1988

* cited by examiner

Primary Examiner—Christopher A. Fiorilla
(74) Attorney, Agent, or Firm—Reising, Ethington, Barnes, Kisselle, Learman & McCulloch, P.C.

(57) ABSTRACT

A process for making articles from perlite material includes grinding raw perlite to a particle size <200 $\mu$m. The ground perlite is mixed with ground silicon carbide powder and moisture added in an amount to achieve a homogeneous mixture having the property of being thixotropic. The mixture is introduced to a mold and agitated to assume the shape of the mold. The agitation is then halted and the material permitted to stiffen to a solidified green molded structure. The molded structure is then removed from the mold and heated at a temperature and time to react the silicon carbide reacts forming carbon dioxide, which induces a foamed structure to the material, and amorphous silicon oxide which fuses with the perlite. The structure is then cooled to yield a resultant fused, foamed perlite article, which may take the form of a building brick, block or panel structure.

16 Claims, No Drawings

METHOD FOR MANUFACTURE OF FOAMED PERLITE MATERIAL

The invention relates to a process for the manufacture of articles made from perlite, and particularly construction and thermal insulation materials, especially in the form of bricks or slabs made from perlite.

BACKGROUND OF THE INVENTION

There are many uses for perlite. These uses can be broken down into three general categories: construction applications, horticultural applications and industrial applications.

Because of the outstanding insulating characteristics and light weight of perlite in its expanded form, it is widely used as a loose-fill insulation in masonry construction. In this application, free-flowing perlite loose-fill masonry insulation is poured into the cavities of concrete block where it completely fills all cores, crevices, water areas and air holes. In addition, to provide thermal insulation, expanded perlite enhances fire ratings, reduces noise transmission and it is rot-, vermin- and termite-resistant. Expanded perlite is also ideal for insulating low temperature and cryogenic vessels. When expanded perlite is used as an aggregate in concrete, a lightweight, fire resistant, insulating concrete is produced that is ideal for roof decks and other applications. Expanded perlite can also be used as an aggregate in Portland cement and gypsum plasters for exterior applications and for the fire protection of beams and columns. Other construction applications include under-floor insulation, chimney lining, paint texturing, gypsum boards, ceiling tiles, and roof insulation boards.

Expanded perlite-simulated stone may be molded to give the appearance of brick, stone or even wood products. A special advantage of expanded perlite simulated stone is that it is light in weight.

Traditional stone and masonry products are heavy and require more expensive structural support. With simulated stone products, traditional framing and supporting materials are usually satisfactory and installation costs can be reduced. A further advantage of lightweight expanded perlite simulated stone products is a reduction in shipping costs and ease of handling. Simulated stone products are excellent for hiding irregular wall surfaces and may be used in a new construction, remodeling and in exterior and interior applications, depending upon the binder used.

U.S. Pat. No. 3,886,076 relates to perlite thermal insulating product and method for producing same. The use of expanded perlite held together by an inorganic binder and a fiber network to form insulation materials is old in the art. As to U.S. Pat. No. 3,886,076 the method of forming a low density corrosion inhibiting thermal insulation product comprises the steps of mixing a wet phase liquids product in a wet phase mixing zone by: adding about 35–52 percent water; adding about 0.33–2.00 percent liquid silicon water repellency material to the water; adding about 13.5–21.0 percent of metallic phosphate binder to the product of the preceding steps. Mixing and agitating is performed in a dry phase mixing zone, whereby about 20.5 to 32 percent expanded perlite having a bulk density from about 2–5 pounds per cubic foot. Not more than 6 percent consist of at least one of sodium tetraborate and sodium silicate and about 1.0–2.5 percent of an inorganic fiber.

The wetted product is placed in a compression zone to form a desired article and the molded product is cured in a heating zone at a temperature of at least 500° F. for a period of time sufficient to heat the molded product throughout to a temperature of at least 480° F.

SU 157 10 13 describes products made of foamed perlite, but this process involves a liquid solution of sodium and potassium silicate with water created by treating perlite with a chemical solution. The resulting liquid solution is heated to produce a "foamed" perlite, usable only for thermal insulating, not construction, and furthermore the resulting product is not perlite.

U.S. Pat. No. 5,516,351 describes a foamed glass product that can be used as insulation products. The foamed glass product is moisture resistant, fire resistant, corrosion resistant and vermin resistant. In order to improve insulative characteristics, the process comprises providing crushed glass particles and a foaming agent, preferably related from $CaCO_3$ or $CaSO_4$. The pre-treated glass and foaming agent are sized and mixed. The mixed glass and foaming agent are placed in molds and passed through a furnace where the mixture is heated to a foaming temperature and then cooled to produce foamed glass blocks.

Furthermore a non-reactive gas selected from $SO_3$ and $CO_2$ is provided to sweep air away from the mixture during heating. The size of the starting glass particles impacts the insulation properties. A starting glass particle size of approximately 100–700 microns is preferred.

U.S. Pat. No. 3,975,174 relates to a method for manufacture of foamed glass. Finely divided glass, which may have a viscosity between $10^6$ and $10^7$ poises at 950° C. to 1100° C. and which may be of a composition suitable to conversion into a vitroceramic, is mixed with up to a few percent by weight of a foaming agent including a mixture of $SnO_2$ and SiC, in equimolar proportions or with an excess of SiC. The resulting mixture is heated to 950° C. to 1100° C. to effect foaming by evolution of $CO_2$ from the foaming agent, and the resulting glass foam is cooled. The nucleation and crystallization steps by which the glass is converted to a vitroceramic may be caused to occur without allowing the foam to return to room temperature.

U.S. Pat. No. 4,992,321 describes a similar method for manufacture of foamed glass.

These known products are relatively expensive and the process to manufacture these products is complicated.

SUMMARY OF THE INVENTION

It is an object of the invention to provide a method to manufacture products that are less expensive than prior art products and that can be performed without using any binders, using raw perlite and not expanded perlite.

In accordance with the invention, the process is characterized by the following steps:

a. raw perlite is ground to a particle size <200 μm;

b. silicon carbide as gas forming reagent is ground;

c. said powders are mixed to form a homogeneous mass;

d. then moisturized to a humidity level to display the property of thixotropy;

e. the mixture is vibrated for even distribution in a mold; then upon ceasing vibrations, the mixture solidifies into a molded article;

f. the solidified article is removed from the mold and heated at a temperature between 1200° C. and 1350° C., and g. the resulting material is cooled.

The benefit of the claimed process is the fact that binders are not necessary with the effect that the manufactured articles are cheaper than the articles according to prior art. The SiC reacts during heating to form gaseous $CO_2$, and also amorphous $SiO_2$. The $SiO_2$ uses with the perlite. The $CO_2$ generates a foamed structure of the fused perlite material.

Furthermore, the fact that the mixture of perlite, SiC and water can be adjusted to have the property of thixotropy and thus can be formed in the mold. The thixotropic mixture when poured into an unheated mold, becomes more fluid when agitated so as to completely and properly fill the mold cavity. Upon stopping the agitation, the m material sets up and takes on the shape of the mold cavity, and retains the shape when removed from the mold (i.e., is very firm and self-supporting). This "green" molded article may then be heated apart from the mold as described to react the SiC to form gaseous $CO_2$ and amorphous $SiO_2$, producing a foamed, fused perlite structure.

The resultant material is a hardened foam with evenly-distributed, isolated spherical pores. The regular distribution of pores improves the properties of the foamed perlite material. The foamed perlite material has an outstanding thermal resistance and strength and is gas and water-proof (i.e., the pores are closed) as well as frost and thermo-resistant. This material also is low density and displays low thermal conductivity.

DETAILED DESCRIPTION

According to the invention, a process for the manufacture of both construction material and thermal insulation material, especially in the form of bricks or slabs, made from perlite, is characterized by the following steps:

a. grinding raw perlite to a particle size <200 microns, b. grinding silicon carbide as gas forming reagent, c. mixing said ground perlite and silicon carbide materials to form a homogeneous powder mass, d. humidifying the powder mass to a humidity level to display the property of thixotropy, e. introducing the thixotropic mixture of materials into a mold and vibrating the mixture for even distribution in the mold; then upon ceasing vibration allowing the mixture to solidify into a molded article, f. removing the molded article from the mold and thereafter heating the article at a temperature between 1200° C. and 1350° C.; and g. cooling the resulting material.

Preferably 100% raw perlite should be used. The raw perlite is ground so that a suitable particle size can be obtained.

The order of mixing and moisturizing in step d.) is interchangeable and shows the same result.

It was found that the property of thixotropy and the properties of the manufactured material depend among other things on the particle size of perlite powder. The best results can be obtained if the particle size is less than 100 $\mu$m, preferably less than 60 microns. The thixotropic mixture exhibits both low static stress (i.e., is highly fluid when agitated) and high static shear stress (i.e., the mixture stiffens when the agitation is halted).

Another important feature is the amount of SiC which preferably is between 0.1 and 1.0% by weight related to the amount of perlite, and its particle size. SiC is also ground to form a powder having a particle size of <100 $\mu$m. Preferably the particle size should be twice as small as the perlite particles. As the silicon carbide particles have a size twice as small as particles of ground perlite, for example less than 30 microns if the particles of ground perlite have a particle size of less than 60 microns, a ratio of particles of silicon carbide to particles of perlite in a range between 1:40 to about 1:200 can be obtained. In that case, every particle of SiC is surrounded by several layers, for example 3–6 layers, of particles of perlite.

Preferably water in the amount of 15–27% by weight related to the homogeneous mixture of perlite and silicon carbide is added to said mixture and to display the properties of thixotropy.

Preferably that mixture is vibrated in a mold horizontally and/or vertically. Vibration of the thixotropic material has the benefit that the material exhibits the behavior of a liquid which can evenly be distributed in the mold. After vibration is stopped the material solidifies and can be removed from the mold for further treatment in a furnace.

The vibration of the thixotropic mixture is performed between 5 and 25 seconds.

At a temperature between 1200° C. and 1350° C., the SiC gas forming reagent forms the spherical pores which is a result of oxidizely-reducing reactions on the surface of partitions of the solid (SiC) and liquid (fused perlite) phases. The oxidizely-reducing reactions lead to the formation of amorphous silica ($SiO_2$) and gaseous phase of carbon dioxide ($CO_2$) from silicon carbide. The source of oxygen for forming $SiO_2$ is the fused perlite.

The formation of evenly-distributed, isolated, spherical pores in the material is accompanied by the decrease of oxygen content in fused perlite (in forming $SiO_2$)leading to the increase of viscosity of fused perlite in the layers surrounding pores and that impedes the confluence of pores and also leads to the increase in viscosity of fused perlite and allows the articles to be heated without molds. In this way, the pores are substantially closed.

The pore size can be adjusted by varying the heating time at the required temperature. If bricks or slabs as construction elements are manufactured, a heating time between 5 and 25 minutes is preferred. If the heating time is short, the resulting porosity of the foamed perlite is relatively small. On the other hand if insulation elements or insulation material is manufactured higher porosity is desired. In that case heating times between 20 and 60 minutes are preferred.

Foamed perlite is an ecologically clean material, which is made from 100% raw perlite without using any binders. This material is a hardened foam with evenly-distributed, isolated, spherical pores, that gives the following properties to this material:
  Gas- and water-proof;
  Frost- and thermo-resistance;
  Thermal resistance in the range: −50° C. +1000° C.;
  Thermal conductivity: 0,15–0.35 W/m.K;
  Density: 150–600 kg/m$^3$;
  Strength: 20–120 kg/cm$^2$.

This new material may be manufactured in the form of bricks, blocks or slabs, for example, with dimensions 500× 500×100 mm for construction and thermal insulation applications:

|  | Construction Material | | Thermal insulation material | |
| --- | --- | --- | --- | --- |
| Density, kg/m$^3$ | 600 | 400 | 250 | 150 |
| Strength, kg/cm$^2$ | 120 | 40 | 50 | 20 |
| Thermal con-Ductivity, W/m · K | 0.35 | 0.25 | 0.20 | 0.15 |
| Weight, kg | 15 | 10 | 6.25 | 3.75 |

As is clear from the above data, the strength of the construction material corresponds to the strength of clay brick and may be used as a material for exterior and interior walls. The strength of the thermal insulation material considerably surpasses the strength of analogous lightweight products from the expanded perlite with binders and may be used without traditional framing and supporting materials in the industrial and housing construction.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A process for molding an article made from perlite material, comprising:
    a. grinding raw perlite material to a particle size <200 microns,
    b. grinding silicon carbide material as gas forming reagent,
    c. mixing said ground perlite and silicon carbide materials to form a homogeneous powder mass,
    d. humidifying the powder mass to a humidity level to display the property of thixotropy,
    e. introducing the thixotropic mixture into a mold and vibrating the mixture to distribute the mixture evenly in the mold; then upon ceasing vibration allowing the mixture to solidify into a molded article,
    f. removing the article from the mold and heating the article at a temperature between 1200° C. and 1350° C.; and
    g. cooling the resulting article.

2. Process according to claim 1, characterized in that 100% pure raw perlite is used for the perlite.

3. Process according to claim 1, characterized in that the order of mixing and humidifying the materials in steps c.) and d.) is interchangeable.

4. Process according to claim 1, characterized by using perlite having a particle size of less than 100 microns.

5. Process according to claim 4, characterized by using perlite having a particle size less than 60 microns.

6. Process according to claim 1, characterized in that silicon carbide in the amount of 0.1 to 1,0% by weight related to the amount of perlite is added to said perlite.

7. Process according to claim 1, characterized by selecting the silicon carbide powder to have a particle size approximately twice as small as that of the perlite.

8. Process according to claim 1, characterized by humidifying the mixture with water in the amount of 15–27% by weight related to the mixture of perlite and silicon carbide to achieve the property of thixotropy.

9. Process according to claim 1, characterized in that said mixture is vibrated in the mold horizontally and/or vertically.

10. Process according to claim 9, characterized in that vibration of said thixotropic mixture is performed between 5 and 25 seconds.

11. Process according to claim 1, characterized in that the duration of that heating at the required temperature is between 5 and 25 minutes.

12. Process according to claim 1, characterized in that the duration of said heating is between 20 and 60 minutes.

13. Process according to claim 1 wherein said article is molded in the shape of at least one article selected from the group consisting of a brick, slab or insulation element.

14. A method for making a molded article from perlite material, comprising:
    combining ground raw perlite having a particle size <200 $\mu$m and ground silicon carbide to form a homogeneous mixture;
    adding moisture to the mixture in a quantity such that the mixture exhibits the property of thixotropy;
    introducing the thixotropic mixture into a mold and agitating the mixture so that the material assumes the shape of the mold;
    halting the agitation of the material and allowing the material to stiffen in the mold to a self-supporting molded structure;
    removing the molded structure from the mold and heating the structure at a temperature of between 1200° C. and 1350° C. for a time sufficient to react the silicon carbide forming amorphous silicon oxide which fuses with the perlite and carbon dioxide which induces a foamed structure to the material; and
    cooling the material to provide a resultant foamed, fused perlite article.

15. The process of claim 14 wherein the mold has the shape of an article of building construction.

16. The process of claim 14 wherein the mold has the shape of a brick or slab.

* * * * *